United States Patent [19]

Pariser

[11] Patent Number: 5,677,967
[45] Date of Patent: Oct. 14, 1997

[54] METHOD OF AND APPARATUS FOR CONVERTING BETWEEN A COLOR APPEARANCE SPACE AND A COLORANT SPACE

[75] Inventor: Edward G. Pariser, Oak Park, Ill.

[73] Assignee: R. R. Donnelley & Sons Company, Lisle, Ill.

[21] Appl. No.: 363,591

[22] Filed: Dec. 23, 1994

Related U.S. Application Data

[63] Continuation of Ser. No. 29,150, Mar. 10, 1993, abandoned.

[51] Int. Cl.$^6$ ............................................. G06K 9/36
[52] U.S. Cl. ........................................................ 382/167
[58] Field of Search ............................ 382/162, 167, 382/276, 274; 358/518, 520, 523, 527, 535

[56] References Cited

U.S. PATENT DOCUMENTS

| | | | |
|---|---|---|---|
| 3,412,240 | 11/1968 | Hunt et al. | 235/164 |
| 3,553,360 | 1/1971 | Land et al. | 178/6.8 |
| 3,600,505 | 8/1971 | Dobouney | 178/5.2 |
| 3,612,753 | 10/1971 | Korman | 178/5.2 |
| 3,651,252 | 3/1972 | Land et al. | 178/6 |
| 3,862,404 | 1/1975 | Fiedrich | 235/152 |
| 3,875,587 | 4/1975 | Pugsley | 358/80 |
| 3,893,166 | 7/1975 | Pugsley | 358/80 |
| 4,060,829 | 11/1977 | Sakamoto | 358/80 |
| 4,075,662 | 2/1978 | Gall | 358/280 |
| 4,090,243 | 5/1978 | Kotera et al. | 364/526 |
| 4,092,668 | 5/1978 | Knop | 358/80 |
| 4,127,871 | 11/1978 | Sakamoto | 358/80 |
| 4,174,514 | 11/1979 | Sternberg | 340/146.3 |
| 4,229,797 | 10/1980 | Ledley | 364/515 |
| 4,243,480 | 1/1981 | Hernadez et al. | 162/141 |
| 4,275,413 | 6/1981 | Sakamoto et al. | 358/80 |
| 4,334,240 | 6/1982 | Franklin | 358/78 |
| 4,346,402 | 8/1982 | Pugsley | 358/80 |

(List continued on next page.)

FOREIGN PATENT DOCUMENTS

| 0 084 228 A2 | 7/1983 | European Pat. Off. . |
| 56-51742 | 5/1981 | Japan . |

(List continued on next page.)

OTHER PUBLICATIONS

Cable, G. R., *CVC Interpolation: Color Correction Using the Clark Vector Correction Algorithm and a Proposed Spatial Extension*, 1988, pp. 1–38.

Kasson, J.M. et al., *A Tetrahedral Interpolation Technique for Color Space Conversion*, IBM Almaden Research Center, San Jose, CA, Feb. 1993, pp. 1–12.

(List continued on next page.)

*Primary Examiner*—Joseph Mancuso
*Assistant Examiner*—Gerard Del Rosso
*Attorney, Agent, or Firm*—Marshall, O'Toole, Gerstein, Murray & Borun

[57] ABSTRACT

A method and apparatus converts from a color appearance space to a colorant space and determines quantities of colorants required to reproduce a color in a medium. A set of input color signals representing a desired or measured color in the color appearance color space is developed and compared to a set of calculated color signals, representing an estimate of the color in the color appearance space, to produce an error signal. A set of scan estimate signals representing color components are generated and converted into a set of colorant estimate signals which represent quantities of colorants in the colorant space required to reproduce the color estimate in the medium. The set of colorant estimate signals are mapped into the color appearance space, according to the characteristics of an output device which is to reproduce the color in the medium, to produce the set of calculated color signals. The set of scan estimate signals are iteratively altered in response to the error signal to develop a set of calculated color signals which approximates the set of input color signals according to an error criterion.

26 Claims, 5 Drawing Sheets

U.S. PATENT DOCUMENTS

| | | | |
|---|---|---|---|
| 4,353,092 | 10/1982 | Bailey et al. | 358/160 |
| 4,354,243 | 10/1982 | Ryan et al. | 364/515 |
| 4,384,336 | 5/1983 | Frankle et al. | 382/49 |
| 4,402,007 | 8/1983 | Yamada | 358/75 |
| 4,402,012 | 8/1983 | Knight | 358/160 |
| 4,402,015 | 8/1983 | Yamada | 358/280 |
| 4,430,668 | 2/1984 | Miles, Jr. | 358/75 |
| 4,445,138 | 4/1984 | Zwirn et al. | 358/166 |
| 4,458,265 | 7/1984 | Yoshida et al. | 358/80 |
| 4,477,833 | 10/1984 | Clark et al. | 358/80 |
| 4,481,532 | 11/1984 | Clark et al. | 358/80 |
| 4,511,989 | 4/1985 | Sakamoto | 364/723 |
| 4,561,016 | 12/1985 | Jung et al. | 358/76 |
| 4,580,134 | 4/1986 | Campbell et al. | 340/703 |
| 4,626,903 | 12/1986 | Giesche et al. | 358/80 |
| 4,665,435 | 5/1987 | Miura | 358/80 |
| 4,670,780 | 6/1987 | McManus et al. | 358/80 |
| 4,679,072 | 7/1987 | Takayama | 358/80 |
| 4,682,186 | 7/1987 | Sasaki et al. | 346/140 R |
| 4,717,954 | 1/1988 | Fujita et al. | 358/80 |
| 4,752,822 | 6/1988 | Kawamura | 358/80 |
| 4,758,885 | 7/1988 | Sasaki et al. | 358/80 |
| 4,805,013 | 2/1989 | Dei et al. | 358/80 |
| 4,839,721 | 6/1989 | Abdulwahab et al. | 358/80 |
| 4,839,722 | 6/1989 | Barry et al. | 358/80 |
| 4,879,594 | 11/1989 | Stansfield et al. | 358/80 |
| 4,882,621 | 11/1989 | Suzuki et al. | 358/80 |
| 4,884,080 | 11/1989 | Hirahara et al. | 346/46 |
| 4,893,181 | 1/1990 | Yeomans | 358/80 |
| 4,894,794 | 1/1990 | Shenk | 364/723 |
| 4,899,215 | 2/1990 | Morita et al. | 358/78 |
| 4,901,258 | 2/1990 | Akiyama | 364/577 |
| 4,908,701 | 3/1990 | Udagawa | 358/80 |
| 4,929,978 | 5/1990 | Kanamori et al. | 355/38 |
| 4,949,135 | 8/1990 | Ng | 355/327 |
| 4,954,912 | 9/1990 | MacDonald et al. | 358/448 |
| 4,959,711 | 9/1990 | Hung et al. | 358/80 |
| 4,959,790 | 9/1990 | Morgan | 364/518 |
| 4,970,584 | 11/1990 | Sato et al. | 358/75 |
| 4,992,861 | 2/1991 | D'Errico | 358/75 |
| 5,065,234 | 11/1991 | Hung et al. | 358/80 |
| 5,073,818 | 12/1991 | Iida | 358/80 |
| 5,081,527 | 1/1992 | Naito | 358/75 |
| 5,087,126 | 2/1992 | Pochieh | 356/402 |
| 5,107,332 | 4/1992 | Chan | 358/80 |
| 5,113,248 | 5/1992 | Hibi et al. | 358/78 |
| 5,119,186 | 6/1992 | Deacon et al. | 358/78 |
| 5,121,196 | 6/1992 | Hung | 358/75 |
| 5,138,699 | 8/1992 | Minor et al. | 395/131 |
| 5,142,356 | 8/1992 | Usami et al. | 358/80 |
| 5,149,960 | 9/1992 | Dunne et al. | 250/226 |
| 5,175,701 | 12/1992 | Newman et al. | 364/723 |
| 5,185,661 | 2/1993 | Ng | 358/75 |

FOREIGN PATENT DOCUMENTS

| | | |
|---|---|---|
| 57-198463 | 12/1982 | Japan . |
| 58-24457 | 2/1983 | Japan . |
| WO 81/03097 | 10/1981 | WIPO . |
| WO 82/02637 | 8/1982 | WIPO . |
| WO 83/00593 | 2/1983 | WIPO . |

OTHER PUBLICATIONS

Cable, G.R., *CVC Interpolation: Color Correction Using the Clark Vector Correction Algorithm and a Proposed Spatial Extension*, 1988, p. 37.

Chow and Kaneko, "Boundary Detection of Radiographic Images By A Threshold Method," *Information Processing*, pp. 1530–1535, North–Holland Publishing Company (1972).

MacAdam, *Color Measurement–Theme and Variations*, Springer–Verlag, First Page of Chapter 8–Color Differences (1981).

Pugsley, "Pre–Press Picture Processing in the Graphic Arts Industry," *IEEE*, 29(12):1891–1897 (Dec. 1981).

METHOD OF AND APPARATUS FOR CONVERTING BETWEEN A COLOR APPEARANCE SPACE AND A COLORANT SPACE

This is a Continuation of U.S. application Ser. No. 08/029,150 filed Mar. 10, 1993, now abandoned.

TECHNICAL FIELD

The present invention relates generally to color reproduction methods and apparatus, and more particularly to a method of and apparatus for converting between a color appearance space such as a colorimetric space, and a colorant space.

BACKGROUND ART

Color reproduction systems typically include a scanner or other device for developing signals representing the colors of picture elements (or "pixels") of an image. These signals may be modified by color correction circuitry to take into account the characteristics of an output device which is to create a reproduction of the image, such as a proofer or press. The color correction circuitry may include, for example, a look-up table (LUT) which stores a number of corrected color values at storage locations accessed by a particular set of addressing signals representing a number of uncorrected colors. An interpolator interpolates between corrected color signals stored in the memory for addressing signals other than those in the particular set. Thus, color correction for a wide range of colors can be accomplished without the need for a large and uneconomical memory.

As part of the color correction process, undercolor removal (UCR) may also be effected wherein black ink is substituted for the quantities of cyan, magenta and yellow inks which produce a neutral or grey tone in the reproduction. In this way, the relatively expensive cyan, magenta and yellow inks can be replaced by the relatively inexpensive black ink and hence savings can be realized. In addition, the dynamic range of the reproduction can be increased by such substitution of inks.

In the past, once the color correction process was completed, the resulting electronic file was typically used to create film separations. The separations were then used to prepare a proof. A color analyst would then visually inspect the proof and determine whether color adjustments were necessary. If so, the color analyst would measure the densities of the separations at the image area of interest using a densitometer and create instructions for console operators who would modify the electronic file. Further film separations and proofs would be prepared until the color analyst was satisfied with the reproduced colors. This process was time consuming and required a great degree of expertise on the part of the color analyst.

With the advent of so-called "digital color proofers," a color proof can now be created directly from the electronic file without the need to prepare film separations. Accordingly, there is no opportunity for the color analyst to measure densities or other color characteristics in order to prepare instructions for console operators except from the proof itself. A spectrophotometer can be used to measure a color in a colorimetric color space, for example, using CIE XYZ or L*a*b* coordinates. Such color spaces are based upon the human visual system and hence provide an indication of how a color is perceived by an observer. Thus, for example, one can measure a color on a reflective reproduction created on a proofer and thus obtain information concerning the appearance of the color to an observer.

SUMMARY OF THE INVENTION

In accordance with one embodiment of the present invention, a color conversion system converts from a color appearance space to a colorant space to develop a set of colorant quantity component signals which reproduces a desired or measured color. This color conversion system allows an operator to develop a set of colorant quantity component signals which reproduce the color more accurately and quickly than prior art methods.

More particularly, a method of converting from a color appearance space to a colorant space comprises the steps of (a) developing a set of input color signals representing a color in the color appearance space, and (b) generating a set of colorant estimate signals representing amounts of colorants. The method includes the further steps of (c) mapping the set of colorant estimate signals into the color appearance space according a characteristic of a particular output device which is to reproduce the color in a medium, to produce a set of calculated color signals representing an approximation of the color in the color appearance space, (d) comparing the set of input color signals to the set of calculated color signals to produce an error signal and (e) altering the set of colorant estimate signals in response to the error signal. Furthermore, the method repeats the above described steps (c)–(e) until an error criterion is satisfied, whereupon the colorant estimate signals represent quantities of the colorants which, when produced by the output device, reproduce the color.

Preferably, the step of generating a set of colorant estimate signals includes the step of developing a set of scan estimate signals representing color components in a scan color space. The step of altering the set of colorant estimate signals may include the steps of providing a look-up table which stores a plurality of sets of colorant quantity values representing colors in the colorant space and each set of which corresponds to a set of color scan values representing a color in the scan color space, interpolating between the sets of colorant quantity values to determine a set of colorant quantity values which corresponds to the set of scan estimate signals and providing the determined set of colorant quantity values as the colorant estimate signals.

Furthermore, the step of mapping may include the steps of providing a look-up table which stores a plurality of sets of color appearance values representing colors in the color appearance space and each set of which corresponds to a set of colorant quantity values representing colors in the colorant space, interpolating between the sets of colorant quantity values to determine a set of color appearance values which corresponds to the set of colorant estimate signals and providing the determined set of color appearance values as the calculated color signals.

Preferably, the color appearance space is a colorimetric color space and the method also includes the step of reproducing the color in the medium according to the set of colorant estimate signals. The step of developing a set of input color signals may include the step of measuring a sample color from a color chart using, for example, a spectrophotometer or measuring a set of color appearance values of an area of an image.

According to another aspect of the present invention, an apparatus which converts from a color appearance space to a colorant space comprises means for developing a set of input color signals representing a color in a color appearance space and means for generating a set of colorant estimate signals representing amounts of colorants. Means are provided for mapping the set of colorant estimate signals into the color appearance space according to a characteristic of a } particular output device which is to reproduce the color in a medium to produce a set of calculated color signals representing an approximation of the color in the color appearance space. Means are also included for comparing the set of input color signals to the set of calculated color signals to produce an error signal and means are responsive to the error signal for iteratively altering the set of colorant estimate signals to develop a set of calculated color signals which approximates the set of input color signals according to an error criterion.

According to a further aspect of the invention, a method of converting a color of an image element from an N-dimensional color appearance space into an M-dimensional colorant space wherein M and N are non-zero positive integers, includes the steps of (a) developing a first M-dimensional addressing signal representing a color in the colorant space, (b) providing a memory having a plurality of M-dimensional addresses each representing a color in the colorant space wherein the memory stores at each address an associated N-dimensional memory output signal representing a corresponding color in the color appearance space and wherein the addressing signal is between addresses of the memory, (c) finding M+1 addresses of the memory surrounding the addressing signal, (d) interpolating between memory output signals stored at the found M+1 addresses in accordance with the addressing signals, (e) developing a further M-dimensional addressing signal representing a further color in the colorant space, and (f) repeating steps (c) through (e) until an error criterion is satisfied, at which time the M-dimensional addressing signal represents the image element color in the colorant space.

DESCRIPTION OF THE PREFERRED EMBODIMENTS

Figure 1:
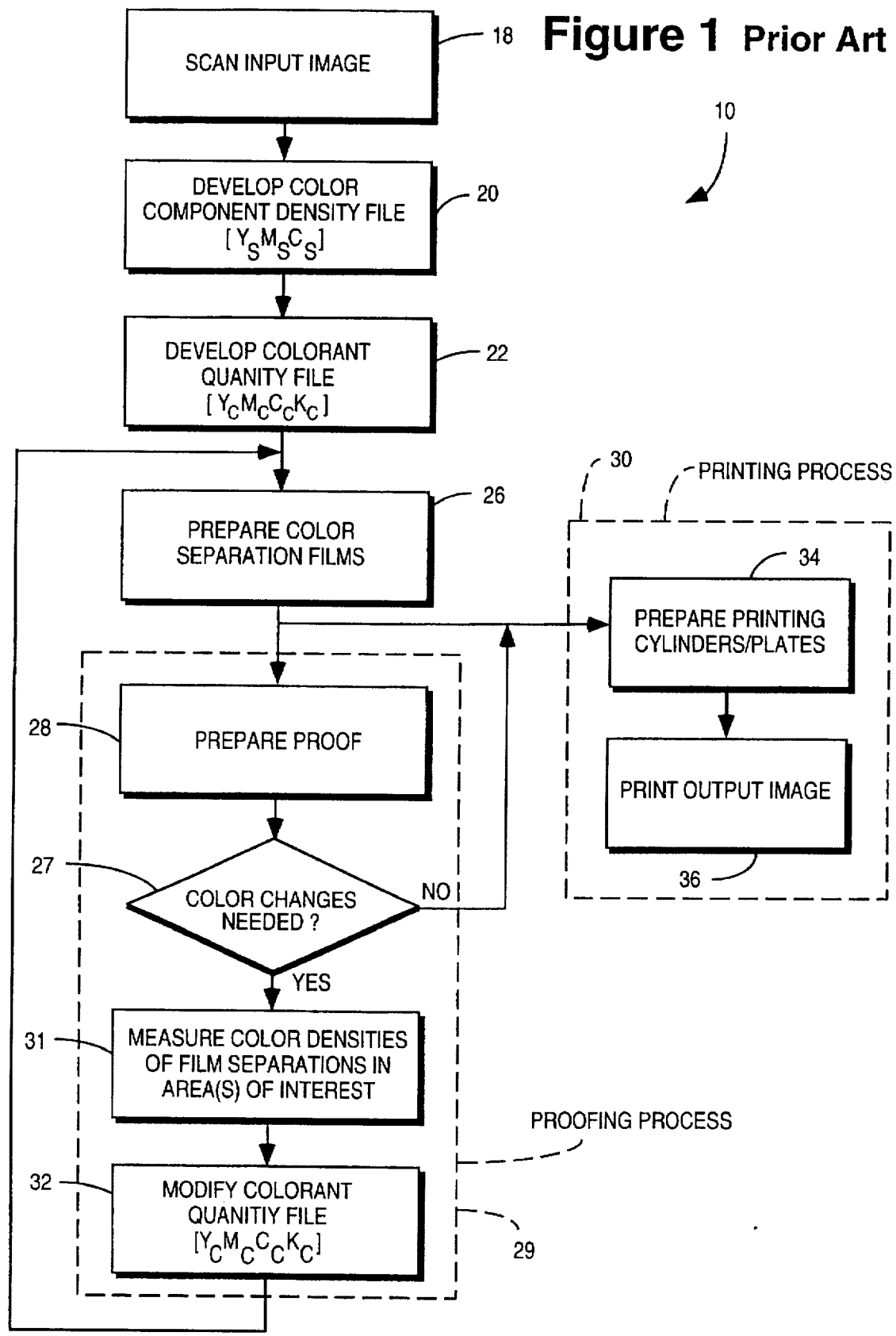
FIG. 1 is a block diagram illustrating the operation of a prior art proof/press color reproduction system.

The block diagram of FIG. 1 illustrates the operation of a prior art proof/press color reproduction system 10 which is capable of reproducing an input image. During an initial portion of a reproduction process at a block 18, the input image is scanned by a scanning device, such as a scanner. The input image, may be, for example, a photograph, a transparency or other image existing in an input medium. As seen at a block 20, the output of the scanner is utilized to develop a color component scan file comprising a set of color component scan values for each pixel of the scanned input image. The color component scan file may include, for example, a set of color scan components $Y_S$, $M_S$, $C_S$ which represent yellow, magenta and cyan color scan components in a scan color space for each pixel of the scanned input image. At a block 22, the color component scan file is converted into a colorant quantity file comprising a set of colorant quantity values $Y_C$, $M_C$, $C_C$, and $K_C$ for each pixel of the scanned input image. Each set of colorant quantity values represents, for example, the yellow, magenta, cyan and key (or black), $Y_C$, $M_C$, $C_C$, and $K_C$ components to be produced by a particular output device in order to reproduce a pixel of the input image in an output medium.

The colorant quantity file is used at a block 26 to prepare a set of four color separation films wherein one color separation film is prepared for each color component of the colorant quantity file. At a block 28, forming a part of a proofing process 29, the color separation films are used to prepare a four-color proof of the input image represented by the colorant quantity file. At this point in the reproduction process, a color analyst typically visually inspects the four-color proof to determine whether corrections need to be made to the colorant quantity file in order to produce a more desirable output image during a printing process 30.

As indicated at a block 27, if the color analyst decides that color changes need to be made, the color analyst uses a densitometer to measure, for example, the densities of the color separation films at locations corresponding to the selected area or areas of the four-color proof at which the color changes are to be made as indicated at a block 31. Knowing the densities, the color analyst then specifies the specific changes to be made to the colorant quantity values as specified by the colorant quantity file at the selected image area or areas in order to achieve desired colors at those areas.

At a block 32, the colorant quantity file is modified to reflect the changes specified by the color analyst. The color analyst may make the changes directly to the colorant quantity file as stored, for example, in a computer memory. Alternatively, the color analyst may issue instructions specifying the colorant changes to be made to the colorant quantity file while other, less technically skilled, computer operators follow the instructions to actually make the changes to the values stored in the colorant quantity file.

After modification of the colorant quantity file, further proof(s) and films may be prepared. Once an acceptable proof has been produced, the films that were used to create the proof are utilized at a block 34 comprising a part of the printing process 30 to engrave a set of gravure cylinders, or, if the printing process 30 is of the offset type, to prepare a set of lithographic plates. At a block 36, the cylinders or plates are used to print the image.

Figure 2:
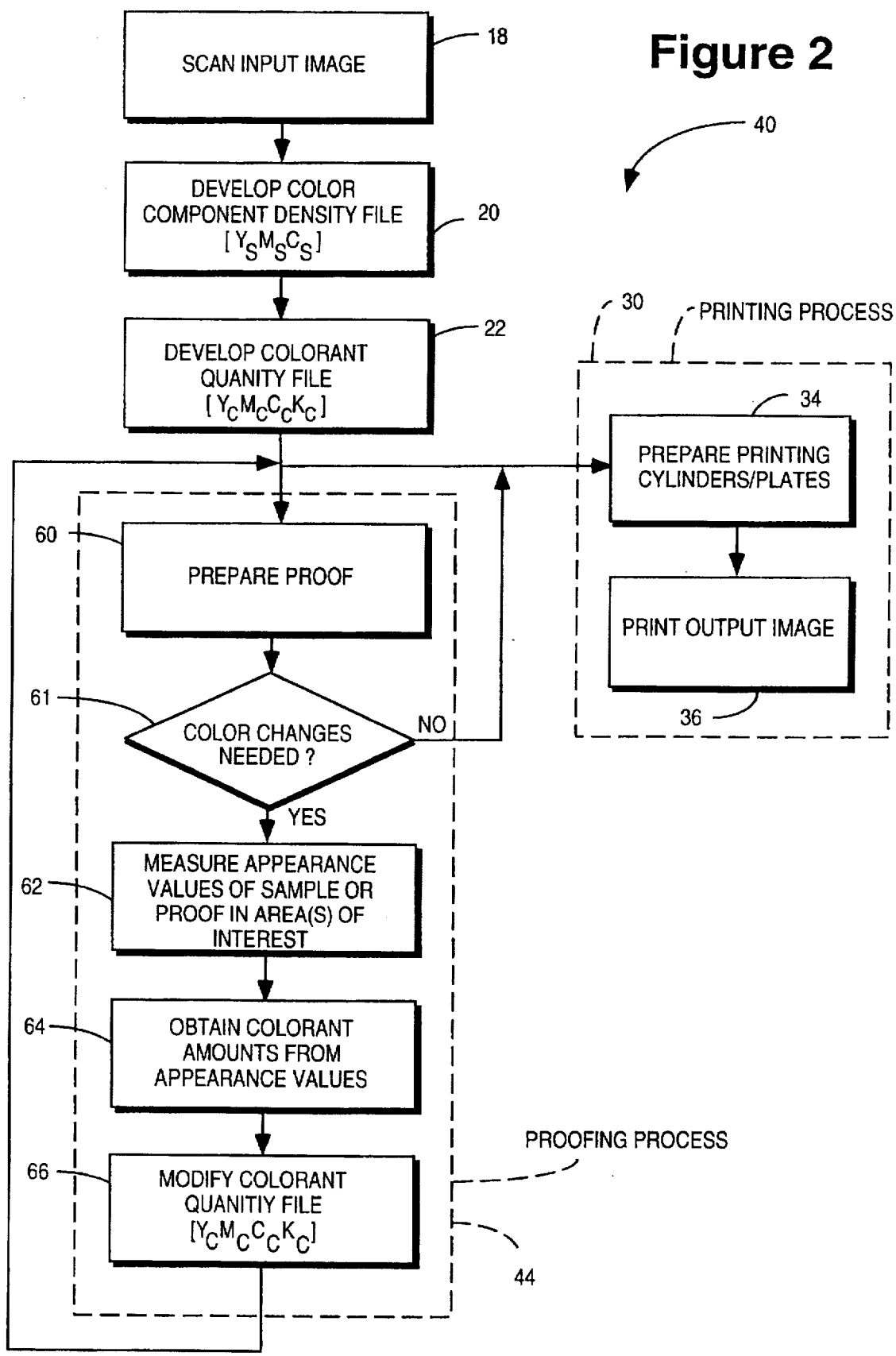
FIG. 2 is a block diagram illustrating the operation of a proof/press color reproduction system employing a color conversion method and apparatus according to the present invention.

Referring now to FIG. 2, a block diagram of a proof/press color reproduction system 40 employing a color conversion method according to the present invention is shown. Steps identical to those illustrated in FIG. 1 are assigned like reference numerals.

A proofing process 44 implemented by the color reproduction system 40 enables a color analyst to proof an image developed from the colorant quantity file without the need to prepare film separations. Thus, a digital proofer may be used to prepare proofs, if desired. Also, the proofing process 44 enables a color analyst to specify color changes in a color appearance space, for example in a colorimetric color space, instead of a colorant space as required in the proofing process 29 of FIG. 1.

More specifically, at a block 60, a four-color proof is prepared from the colorant quantity file using a digital proofer. As represented by a block 61, the color analyst uses the four-color proof to determine any changes to be made to the colorant quantity file. The color analyst can specify changes to an area of the four-color proof in any desired manner. For example, the color analyst can specify that a particular color be substituted for a color within a selected area of the four-color proof. Thus, as indicated by a block 62, the color analyst uses a color appearance measurement device, such as a spectrophotometer or a colorimeter, to measure the color appearance values of a known color sample appearing, for example, on a test chart or color chip. The output of the spectrophotometer, which may comprise a set of color appearance values in a colorimetric space, for example, CIE L*a*b*, defines a desired color to be substituted for the color in the selected area. Alternatively, the color analyst can measure the color appearance components of an area of interest on the four-color proof and then alter the measured appearance values in any desired manner to determine a new set of color appearance values which define a desired color to be substituted for the measured color in the selected area. In yet another alternative method, the color analyst can generate a set of desired color appearance values without the use of the spectrophotometer by, for example, choosing a set of color appearance values to replace the color within the area of interest on the four-color proof.

Once the color analyst has developed the replacement set of color appearance values, the developed set of color appearance values are used at a block 64 to develop a replacement set of colorant quantity values which, as shown at a block 66, replace values stored in the colorant quantity file at file locations corresponding to the pixels within the selected area or areas of the proof. A new colorant quantity file is thus produced including the color(s) developed from the replacement set of color appearance values in the selected area(s). Following the block 66, an operator decides to either repeat the proofing process 44 or initiate the printing process 30. As part of the printing process 30, cylinders or plates may be prepared through the use of film separations, or the cylinders or plates may be prepared directly from the colorant quantity file without the need for intermediate film separations.

Figure 3:
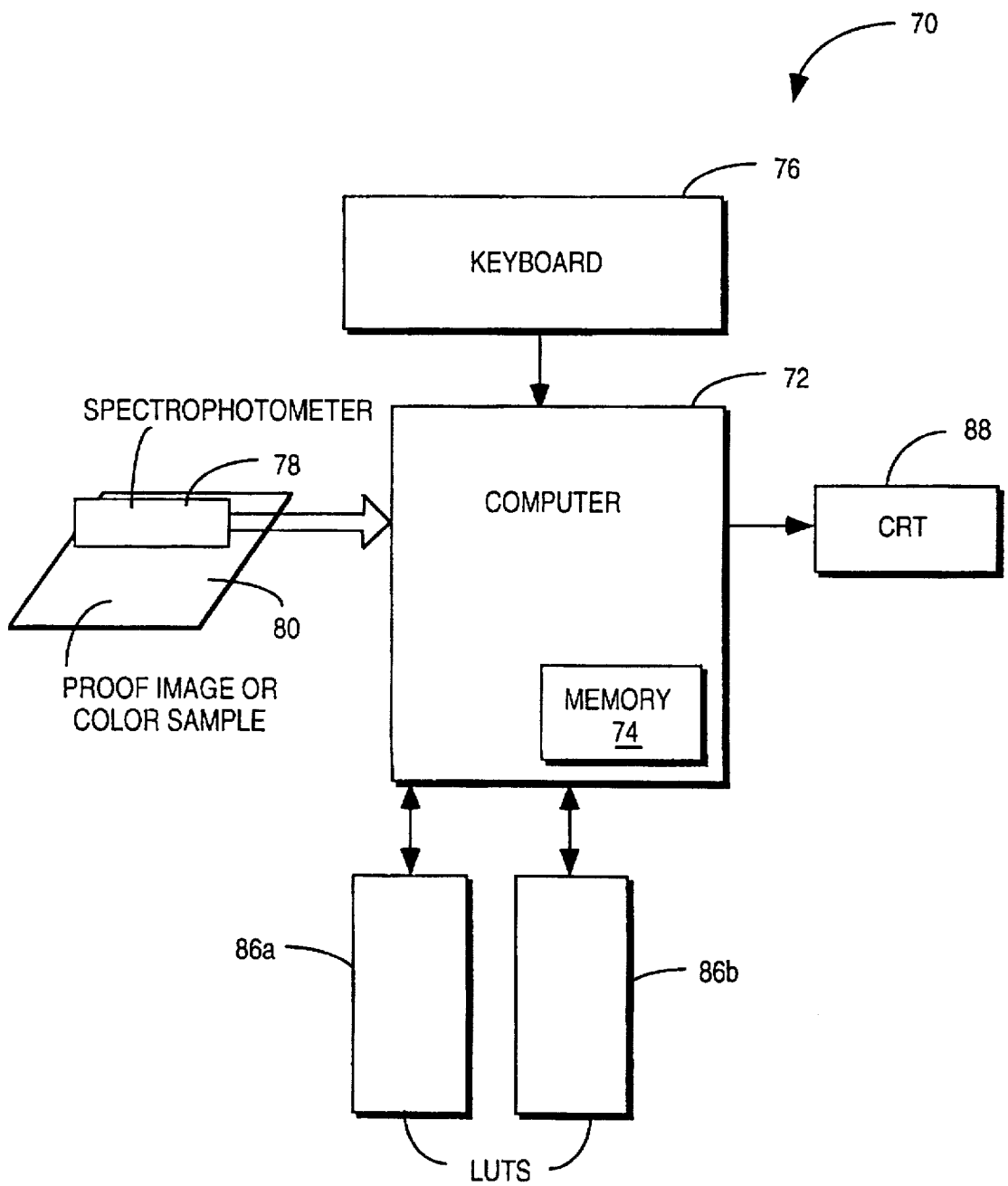
FIG. 3 is a combined block and simplified schematic diagram of a color conversion system implementing the color conversion method according to the present invention.

Referring now to FIG. 3, a proof/press color conversion system 70, which is capable of implementing the functions of blocks 62 and 64 of FIG. 2, includes a computer 72 having a memory 74. A keyboard 76 is connected to the computer 72 and enables an operator to enter data and commands manually into the computer 72. A spectrophotometer 78 measures the spectrum of light reflected from an area of an image 80, which may comprise a proof image or a known color sample printed on a test chart. The spectrophotometer produces signals indicative of the color appearance values of an area of the image 80. The color appearance values, which may, for example, comprise L*, a*, b* coordinates in the CIE L*a*b* color space, are delivered to the computer 72.

The computer 72 operates in conjunction with look-up tables (LUT's) 86a, 86b which store data used by the computer 72 to convert between color spaces, as noted in greater detail hereinafter. The LUT 86a stores the data used by a color reproduction system to color correct the image stored in the colorant quantity file of the color reproduction system. A CRT 88 is attached to the computer 72 and may display color conversion data or other data stored within the computer 72.

During the proofing process 44 described with respect to FIG. 2, the color analyst reviews the proof image to determine if color changes are required. The proof image may be produced by a proofer (not shown) of the color reproduction system. The proofer along with a press (not shown) are connected to a color correction computer (not shown) which produces and stores the colorant quantity file representing the image to be produced by the press. Preferably, the color reproduction characteristics of the proofer and the color reproduction characteristics of the press which will be used to create the final reproduction(s) are calibrated so that the image printed by the proofer is substantially the same as the image which will be produced by the press. If color changes are required in one or more area(s) of the proof, the color analyst uses the spectrophotometer 78 to determine the appearance values at one or more points at the area(s) of interest to determine what changes are to be made thereto, or, alternatively, the color analyst uses the spectrophotometer to determine the appearance values of a color chip or a color sample having a color which is to be reproduced in each area.

The computer 72 executes software to implement a color conversion routine, described hereinafter, which uses the desired color appearance values to produce sets of colorant quantity values which will be used to replace the colorant quantity values in the colorant quantity file at the pixel locations corresponding to the selected image area or areas of the proof where a color change is desired. The color analyst may indicate the area or areas of the proof image which he desires to alter by circling a desired area on the actual proof and supplying the proof and instructions to an operator who makes changes to the colorant quantity file stored in the color correction computer according to the color analyst's instructions. Alternatively, the color analyst can display a representation of the input image on a CRT attached to the color correction computer and manually indicate the areas to be altered, through the use of, for example, a masking routine. In this case, the color correction computer determines the exact pixel locations which define the area or areas to be changed by searching through the colorant quantity file, pixel by pixel, and altering the values of the colorant quantity file corresponding to those pixels according to the criteria developed by the color analyst.

There are a number of ways in which the color analyst can specify that changes are to be made to the colorant quantity file. For example, the color analyst can specify that only particular colorant values within the colorant quantity file be replaced with the exact colorant quantity values determined by the computer 72 during the color conversion routine. Linear and nonlinear changes can also be applied to colorant quantity values which fall within a specified range. Thus, for example, the color analyst may specify that all of the colorant quantity values of the pixels of a specified area of the proof image having a $C_C$ value within the range of 10 to 100 be increased a particular amount or a particular percentage or altered according to other linear or nonlinear functions. It should be noted that the functions performed by the computer 72 may be combined with the functions performed by the color correction computer in a single computer system.

Figure 4:
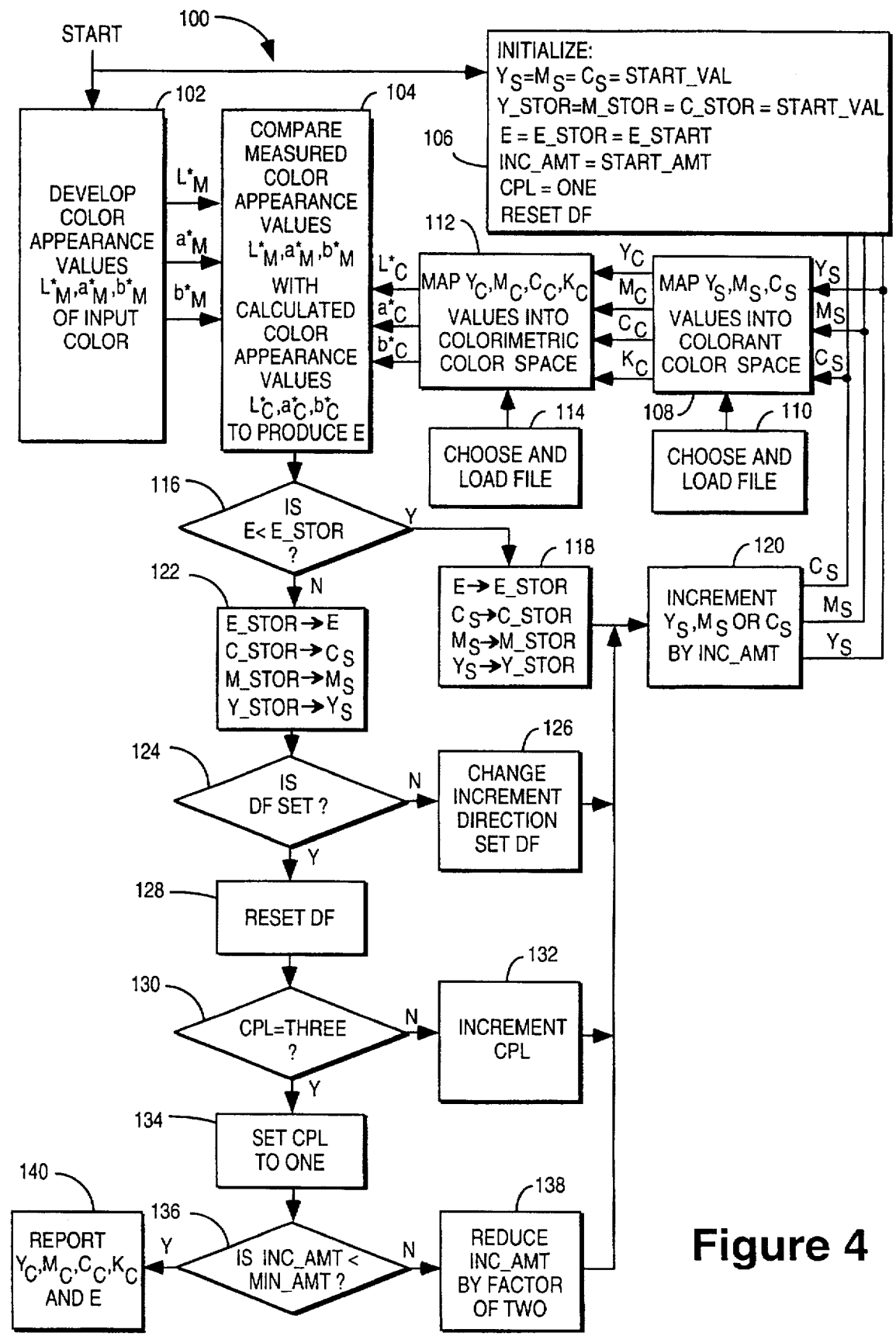
FIG. 4 is a flowchart illustrating the color conversion method of the present invention implemented by the computer of FIG. 3.

Referring now to FIG. 4, a flowchart illustrates the operation a color correction routine 100 which is implemented by the computer 72 and which determines, for a given set of color appearance values representing a particular color, the set of colorant quantity components to be produced by a particular output device in order to reproduce the desired color in an output medium. Generally, the routine 100 compares the color appearance values of a desired or measured color (denoted in FIG. 4 as $L^*_M$, $a^*_M$ and $b^*_M$) with the appearance values of a color estimate defined by a set of color scan component signals $Y_S$, $M_S$, $C_S$ which, when converted to the color space of the output device, is defined by colorant quantity component signals $Y_C$, $M_C$, $C_C$, and $K_C$.

During operation, the routine 100 iteratively determines the set of color scan component signals which, when converted into a set of colorant quantity component signals, substantially reproduces the desired color. At the start of the iterative process, the routine 100 chooses an initial arbitrary set of color scan component signals as a color estimate, converts the set of color scan component signals into a set of colorant quantity component signals, which comprise a set of color estimate signals, taking into account the color reproduction characteristics of a particular output device to be used and calculates the set of color appearance values which would be measured by, for example, a spectrophotometer, if the color estimate were produced by the output device. The routine 100 then compares the calculated set of color appearance values with the measured set of color appearance values to produce an error. The routine 100 iteratively adjusts the color scan component signals $Y_S$, $M_S$, $C_S$, which comprise a set of scan estimate signals, by a predetermined incremental amount INC AMT in both positive and negative directions in accordance with the error until the set of color scan component signals which produces the lowest error has been determined. During each of a series of passes, the routine 100 successively decreases the incremental amount INC_AMT and continues until the incremental amount INC_AMT falls below a minimum amount MIN_AMT.

Specifically, as shown by a block 102, the appearance values of the desired or measured color $L^*_M$, $a^*_M$, $b^*_M$, are determined and delivered to a block 104 described hereinafter. Concurrently, a block 106 initializes a number of variables. Specifically, the block 106 sets each of three variables $Y_S$, $M_S$, $C_S$, which together represent the color scan components of an initial color estimate, equal to a value START_VAL which may be, for example, 128. (For an eight-bit scan, each color scan component would have a value between zero and 255.) The block 106 also sets variables Y_STOR, M_STOR, and C_STOR equal to the value START_VAL and sets a stored error variable E_STOR equal to a predetermined value E_START which is an arbitrarily high value. The variables Y_STOR, M_STOR and C_STOR hold the values of the color scan component signals which have been determined by the routine 100 at any given time and represent the current best estimate of the desired or measured color. The error variable E_STOR represents the lowest error determined by the routine 100 at any given time. Furthermore, the initialization block 106 sets a color plane indication CPL to a value of one, sets the variable INC_AMT equal to a value START_AMT which is equal to, for example, 16, and resets a direction flag DF, the function of which is described below. The block 106 supplies the color scan component signals $Y_S$, $M_S$, $C_S$ to a block 108.

The block 108 uses the look-up table (LUT) 86a, as loaded with values chosen by an operator at a block 110, to map the color scan component signals $Y_S$, $M_S$, $C_S$ into a colorant color space for a particular output device.

In the preferred embodiment, the block 108 converts the color scan component signals $Y_S$, $M_S$, $C_S$ into the colorant quantity component signals $Y_C$, $M_C$, $C_C$, $K_C$ using the LUT 86a and the interpolation method described in Clark, et al., U.S. Pat. No. 4,477,833, entitled "Method of Color Conversion with Improved Interpolation," which is assigned to the assignee of the present invention and the disclosure of which is hereby incorporated by reference herein. In the preferred embodiment, however, floating point variables are used for computational purposes instead of the eight-bit variables described in the Clark '833 patent. Four colorant quantity component signals $Y_C$, $M_C$, $C_C$ and $K_C$ are thus produced which represent the amounts of yellow, magenta, cyan and key colorants, respectively, which, if applied to the output medium by the output device, produce the color estimate in the output medium.

It should be noted that the data loaded into the LUT 86a can be developed and stored according to any known technique, for example in the manner described in detail in Clark, et al., U.S. Pat. No. 4,481,532, entitled "Method of Determining and Storing Color Printing Information," which is assigned to the assignee of the present invention and the disclosure of which is hereby incorporated by reference herein.

The block 108 delivers the colorant quantity component signals $Y_C$, $M_C$, $C_C$ and $K_C$ to a block 112 which uses the LUT 86b, as loaded with values chosen by the operator at a block 114, to map the colorant quantity component signals $Y_C$, $M_C$, $C_C$ and $K_C$ into the color appearance space in which the desired or measured input color is defined. Thus, the block 112 produces a set of calculated colorimetric values $L^*_c$, $a^*_c$, and $b^*_c$ which together represent the color appearance values of the color estimate defined by the colorant quantity component signals $Y_C$, $M_C$, $C_C$, $K_C$. The mapping and interpolation routine used by the block 112 is described in detail hereinafter.

The block 104 compares the calculated colorimetric values $L^*_c$, $a^*_c$, $b^*_c$ to the measured colorimetric values $L^*_M$, $a^*_M$, $b^*_M$ to produce an error signal E which is indicative of the error therebetween. Preferably, the error signal E is developed using a least-square error algorithm, and may be identical to the quantity $\Delta e^*$ defined by CIE standards.

A block 116 compares the error signal E with the stored error variable E_STOR. If the error signal E is less than the variable E_STOR, the values of the color scan component signals $Y_S$, $M_S$, $C_S$ represent a better estimate of the desired or measured input color than the values of the variables Y_STOR, M_STOR, C_STOR. In such a situation a block 118 transfers the values of the variables E, $Y_S$, $M_S$, and $C_S$, to the variables E_STOR, Y_STOR, M_STOR AND C_STOR, respectively.

Following the block 118, control passes to a block 120 which increments one of the color scan component signals $Y_S$, $M_S$ or $C_S$ by the value of the variable INC_AMT. The identity of the particular component to be incremented is indicated by the value of the color plane indication CPL. For example, if CPL is equal to one, the yellow color scan component signal $Y_S$ is incremented. Likewise, if CPL is equal to two, the magenta color scan component signal $M_S$ is incremented and if CPL is equal to three, the cyan color scan component signal $C_S$ is incremented. In this manner, the block 120 produces a new set of color scan component signals $Y_S$, $M_S$, $C_S$ which are sent to the block 108.

The blocks 108, 112, 104, 116, 118 and 120 form a loop wherein the values of the color scan component signals $Y_S$, $M_S$, $C_S$ are iteratively modified or altered so as to produce a set of calculated colorimetric values $L^*_c$, $a^*_c$, $b^*_c$ which approach the desired or measured colorimetric values $L^*_M$, $a^*_M$, $b^*_M$.

When the block 116 determines that the error signal E is greater than or equal to the error variable E_STOR, indicating that the routine 100 is not converging toward a better color estimate, a block 122 replaces the color scan component signals, $Y_S$, $M_S$, and $C_S$ and the error signal E with the values of the variables Y_STOR, M_STOR, C_STOR and E_STOR, respectively. Next, a block 124 determines whether the direction flag DF has been set. If not, indicating that the current color scan component signal identified by CPL has been incremented in only one direction, a block 126 changes the increment direction, by, for example, changing the sign of the variable INC_AMT and sets the direction flag DF. The routine 100 then returns to the block 120 which increments the current color scan component signal $Y_S$, $M_S$, or $C_S$, (as indicated by CPL) in the new incremental direction to produce a new set of color scan component signals $Y_S$, $M_S$ and $C_S$.

If, however, the direction flag DF has been set, which indicates that the current color scan component signal has been incremented in both directions, control transfers to a block 128 which resets the direction flag DF. A block 130 then determines whether all the color scan component signals $Y_S$, $M_S$ and $C_S$ have been incremented by checking to determine whether CPL equals three. If not, a block 132 increments CPL to select a new color scan component signal and control returns to the block 120 which increments the new color scan component signal value by INC_AMT.

If, however, the block 130 determines that CPL is equal to three, a block 134 resets CPL to one and a block 136 determines whether the variable INC_AMT is less than the variable MIN_AMT. If the variable INC_AMT is greater than or equal to the variable MIN_AMT, a block 138 reduces the value of INC_AMT by a predetermined factor, for example, two. The block 138 then returns control to the block 120 which increments the first color scan component signal $Y_S$ by the new value of the variable INC_AMT to produce a new set of color scan component signals $Y_S$, $M_S$, $C_S$. Thus, the blocks 134, 136 and 138 enable the routine 100 to complete multiple passes so as to iteratively reduce the value INC_AMT by which the color scan component signals $Y_S$, $M_S$, $C_S$ are incremented, which, in turn, reduces the magnitude of the error signal E calculated by the block 104.

If the block 136 determines that the value of INC_AMT is less than the value of MIN_AMT, an error criterion has been satisfied indicating that an acceptable set of color scan component signals $Y_S$, $M_S$, $C_S$ and, in turn, an acceptable set of colorant quantity component signals $Y_C$, $M_C$, $C_C$, $K_C$, have been found. When the error criterion is satisfied, a block 140 reports the final set of colorant quantity component signals $Y_C$, $M_C$, $C_C$, $K_C$ and the error signal E associated with that set of colorant quantity component signals to the operator via the CRT 88 shown in FIG. 3.

In this manner, an error criterion is employed to convert a set of color appearance values $L^*_M$, $a^*_M$, $b^*_M$ into a set of colorant estimate signals $Y_C$, $M_C$, $C_C$ and $K_C$. It should be noted that the error criterion may instead or additionally be satisfied whenever the error signal E is less than a predetermined value which may, for example, be loaded into the error variable E_STOR, or when the routine 100 completes a predetermined number of passes or when any other desired criterion is satisfied.

Although the color conversion routine 100 has been described as implemented in a software program that is run on a computer, the color conversion routine 100 can also be implemented using hardware components or any other means which perform essentially the same functions as those described above.

Figure 5:
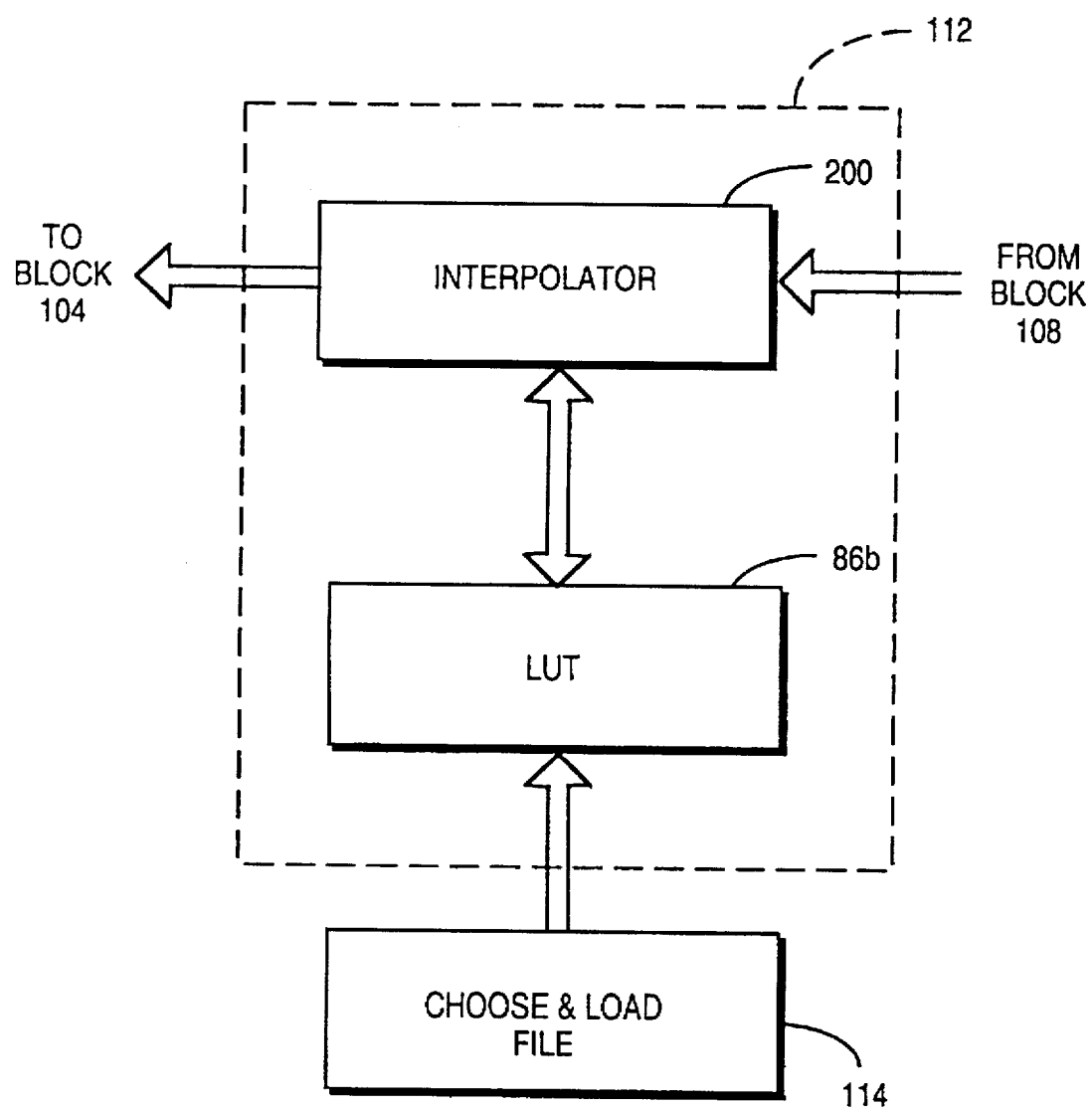
FIG. 5 comprises a more specific block diagram of the block 112 of FIG. 4.

Referring now to FIG. 5, the block 112 comprises an interpolator block 200 and the look-up table (LUT) 86b wherein the latter is loaded by the block 114 of FIG. 4 and in which is stored a plurality of, for example, 1,296 $L^*$, $a^*$, $b^*$ values at addresses adapted to be accessed by addressing signals wherein each address represents a color in the colorant color space. If desired, a different number of values may be stored in the memory. In the event the $Y_C$, $M_C$, $C_C$, $K_C$ colorant quantity component signals from the block 112 correspond to an address of the LUT 86b, the interpolator block 200 simply retrieves the $L^*$, $a^*$, $b^*$ value stored at such address and supplies the same to the block 104. For those $Y_C$, $M_C$, $C_C$, $K_C$ component signals which are between addressing signals, the interpolator block 200 determines five memory addresses surrounding the $Y_C$, $M_C$, $C_C$, $K_C$ component signals and interpolates between the $L^*$, $a^*$, $b^*$ values stored at such addresses to obtain an interpolated $L^*$, $a^*$, $b^*$ value which is in turn supplied to the block 104.

The interpolator block 200 and the LUT 86b together effect a conversion from a four-dimensional $Y_C$, $M_C$, $C_C$, $K_C$ input color space to a three-dimensional $L^*$, $a^*$, $b^*$ colorimetric output space. In order to effect this conversion, the interpolator block 200 undertakes a four-dimensional interpolation process wherein coordinates in the fourth dimension in the output color space are set equal to zero at all positions in the output color space. If desired, the four-dimensional $Y_C$, $M_C$, $C_C$, $K_C$ colorant quantity component signals may instead be converted into a four-dimensional space wherein the coordinates are nonzero for all dimensions. Alternatively, the interpolator block 200 and the LUT 86b may instead convert from an M-dimensional space to an N-dimensional space where M and N may be any integers and may be equal or unequal, as desired. The interpolation process comprises an extension of that disclosed in the Clark, et al. '833 patent incorporated by reference above, with the exception that floating point variables are used rather than eight-bit variables. Generally, in the Clark, et al. '833 patent, four addresses representing points in an input color space, designated BASE, PRI, SEC and NEXT, are found and interpolation is effected between the memory contents stored at these four addresses. In the interpolation process effected by the interpolator block 200, a fifth point, designated TER, is defined and interpolation between values stored at addresses corresponding to the five points is undertaken.

More specifically, the four-dimensional $Y_C$, $M_C$, $C_C$, $K_C$ component signals from the block 108, together denoted INPUT, may be considered as a point in an input color space defined by a vector $\overrightarrow{INPUT}$ which begins at the origin of the input color space and terminates at a point ($Y_{CIN}$, $M_{CIN}$, $C_{CIN}$, $K_{CIN}$).

A set of four-dimensional signals, together called BASE, is found from the component signals of INPUT by searching along each color axis in the input color space. Each component of BASE comprises the address just below the respective component of INPUT. A vector $\overrightarrow{BASE}$ may then be considered as extending from the origin of the input color space to one corner of a four-dimensional hypercube which is defined by the sixteen closest addresses of the LUT 86b surrounding the signal INPUT. The corner defined by the vector $\overrightarrow{BASE}$ is the corner of the hypercube closest to the origin of the INPUT color space and is the memory address next below the signal INPUT.

In accordance with the preferred embodiment, the points stored in the LUT 86b are not equally spaced in terms of digital values (or "dv's") throughout the input color space. Rather, the points stored in the LUT 86b are preferably spaced by equal visually perceptible differences throughout the input color space. Thus, for example, the spacing between the first point stored in the memory and a second, neighboring point may be sixteen dv's along each of the $Y_C$, $M_C$, $C_C$, $K_C$ axes but the spacing between the second point and a neighboring third point may be twenty-two dv's along one or more axes and sixteen dv's along the remaining axes.

If desired, any other spacing may be utilized, including a spacing wherein points are uniformly spaced throughout the input color space.

The vector $\overrightarrow{BASE}$ is then incremented by first through fourth spacing values SVY, SVM, SVC, SVK along the four axes to identify a vector, called $\overrightarrow{NEXT}$, which extends from the origin of the input color space and terminates at a point NEXT located at the corner of the above-defined hypercube farthest away from the origin of the input color space. The first through fourth spacing values SVY-SVK are the values in dv's representing the spacings between the corners of the above-defined hypercube.

As should be evident from the foregoing, the use of the term "hypercube" is not to be construed as meaning that the spacing values $SV_1$–$SV_4$ in any particular neighborhood of the input color space must be all equal; rather, these values may be unequal so that the four-dimensional solid defined by the sixteen points surrounding INPUT has unequal dimensions.

A vector $\overrightarrow{DIFF}$ (difference) is defined by subtracting the vector $\overrightarrow{BASE}$ from the vector $\overrightarrow{INPUT}$. The components of the vector $\overrightarrow{DIFF}$ represent the distances along the four color axes between the points BASE and INPUT.

From the vector $\overrightarrow{DIFF}$, a vector called $\overrightarrow{COLOR}$ is defined as follows:

$\overrightarrow{COLOR}$=(SVY, 0, 0, 0) if the yellow component is the greatest component of the vector $\overrightarrow{DIFF}$;

$\overrightarrow{COLOR}$=(0, SVM, 0, 0) if the magenta component is the greatest component of the vector $\overrightarrow{DIFF}$;

$\overrightarrow{COLOR}$=(0, 0, SVC, 0) if the cyan component is the greatest component of the vector $\overrightarrow{DIFF}$; and $\overrightarrow{COLOR}$=(0, 0, 0, SVK) if the key component is the greatest component of the vector $\overrightarrow{DIFF}$.

where the components of the vector $\overrightarrow{COLOR}$ are an ordered quartet along the yellow, magenta, cyan and key axes, respectively, and where the values SVY, SVM, SVC and SVK are the spacing values between corners defining the hypercube in the input color space along each of the yellow, magenta, cyan and key axes, respectively, as noted above.

From the foregoing determination, a second vector, denoted $\overrightarrow{COMP}$, is defined as follows:

$\overrightarrow{COMP}$=(0, 0, SVC, SVK) if the cyan and key components are the largest components of the vector $\overrightarrow{DIFF}$;

$\overrightarrow{COMP}$=(0, SVM, 0, SVK) if the magenta and key components are the largest components of the vector $\overrightarrow{DIFF}$;

$\overrightarrow{COMP}$=(0, SVM, SVC, 0) if the magenta and cyan components are the largest components of the vector $\overrightarrow{DIFF}$;

$\overrightarrow{COMP}$=(SVY, 0, 0, SVK) if the yellow and key components are the largest components of the vector $\overrightarrow{DIFF}$;

$\overrightarrow{COMP}$=(SVY, 0, SVC, 0) if the yellow and cyan components are the largest components of the vector $\overrightarrow{DIFF}$; and $\overrightarrow{COMP}$=(SVY, SVM, 0, 0) if the yellow and magenta components are the largest components of the vector $\overrightarrow{DIFF}$.

In addition to the foregoing, a third vector, denoted $\overrightarrow{LOWEST}$, is defined as follows:

$\overrightarrow{LOWEST}$=(0, SVM, SVC, SVK) if the yellow component is the least component of the vector $\overrightarrow{DIFF}$;

$\overrightarrow{LOWEST}$=(SVY, 0, SMC, SVK) if the magenta component is the least component of the vector $\overrightarrow{DIFF}$;

$\overrightarrow{LOWEST}$=(SVY, SVM, 0, SVK) if the cyan component is the least component of the vector $\overrightarrow{DIFF}$; and $\overrightarrow{LOWEST}$=(SVY, SVM, SVC, 0) if the key component is the least component of the vector $\overrightarrow{DIFF}$.

The vectors $\overrightarrow{COLOR}$, $\overrightarrow{COMP}$ and $\overrightarrow{LEAST}$ are used to develop signals representing three further corners of the hypercube surrounding the point INPUT, in addition to the corners BASE and NEXT, as follows:

PRI=coordinates of ($\overrightarrow{BASE}$+$\overrightarrow{COLOR}$);

SEC=coordinates of ($\overrightarrow{BASE}$+$\overrightarrow{COMP}$); and

TER=coordinates of ($\overrightarrow{BASE}$+$\overrightarrow{LOWEST}$).

It can be seen that the corner PRI is defined by the coordinates of the corner BASE incremented by the respective spacing value in the direction of the axis along which the component $\overrightarrow{DIFF}$ is at a maximum.

Similarly, the corner SEC is defined by the coordinates of the corner BASE incremented by the respective spacing values in the directions of the two axes along which the highest and next highest components of the vector $\overrightarrow{DIFF}$ occur.

The corner TER is defined by the coordinates of the corner BASE incremented by the respective spacing values in the directions of the three axes along which the three highest components of the vector $\overrightarrow{DIFF}$ occur.

It can be seen that the corners PRI, SEC, TER and NEXT represent the addresses for the LUT 86b which are next above the signal INPUT.

Signals representing the corners BASE, PRI, SEC, TER and NEXT are used by the interpolator block 200 to address the LUT 86b. In response to this addressing, the LUT 86b produces signals F1–F5, respectively, each representing a set of values of L*, a*, b* wherein each set in turn represents appearance values in the output color space along with a fourth value which is zero. The values $F_1$–$F_5$ are the values in the output color space which are then used in a mathematical equation set out below:

$$L^*_o = L^*_1 + (L^*_2 - L^*_1)\frac{D_1}{SV_H} + (L_3^* - L_2^*)\frac{D_2}{SV_{MH}} +$$

$$(L_4^* - L_3^*)\frac{D_3}{SV_{ML}} + (L_5^* - L_4^*)\frac{D_4}{SV_L}$$

$$a^*_o = a_1^* + (a_2^* - a_1^*)\frac{D_1}{SV_H} + (a_3^* - a_2^*)\frac{D_2}{SV_{MH}} +$$

$$(a_4^* - a_3^*)\frac{D_3}{SV_{ML}} + (a_5^* - a_4)\frac{D_4}{SV_L}$$

-continued
$$b_o^* = b_1^* + (b_2^* - b_1^*)\frac{D_1}{SV_H} + (b_3^* - b_2^*)\frac{D_2}{SV_{MH}} +$$
$$(b_4^* - b_3^*)\frac{D_3}{SV_{ML}} + (b_5^* - b_4^*)\frac{D_4}{SV_L}$$

where:

$SV_H$=the value of SVY-SVK associated with the largest component of $\overrightarrow{DIFF}$ $SV_{MH}$=the value of SVY-SVK associated with the second largest component of $\overrightarrow{DIFF}$ $SV_{ML}$=the value of SVY-SVK associated with the third largest component of $\overrightarrow{DIFF}$ $SV_L$=the value of SVY-SVK associated with the smallest component of $\overrightarrow{DIFF}$ and where:

$F_1=(L^*_1, a^*_1, b^*_1)$=LUT data representing CONVERTED BASE $F_2=(L^*_2, a^*_2, b^*_2)$=LUT data representing CONVERTED PRI $F_3=(L^*_3, a^*_3, b^*_3)$=LUT data representing CONVERTED SEC $F_4=(L^*_4, a^*_4, b^*_4)$=LUT data representing CONVERTED TER $F_5=(L^*_5, a^*_5, b^*_5)$=LUT data representing CONVERTED NEXT $D_1$=SVY$-C_H$ if the yellow component is the greatest component of the vector $\overrightarrow{DIFF}$ $D_1$=SVM$-C_H$ if the magenta component is the greatest component of the vector $\overrightarrow{DIFF}$ $D_1$=SVC$-C_H$ if the cyan component is the greatest component of the vector $\overrightarrow{DIFF}$ $D_1$=SVK$-C_H$ if the key component is the greatest component of the vector $\overrightarrow{DIFF}$ $D_2=C_H-C_{MH}$
$D_3=C_{MH}-C_{ML}$
$D_4=C_{ML}-C_L$
$D_5=C_L$ where $C_H$, $C_{MH}$, $C_{ML}$ and $C_L$ are the greatest to least scalar components, in order, of the vector $\overrightarrow{DIFF}$ and CONVERTED BASE, CONVERTED PRI, CONVERTED SEC, CONVERTED TER and CONVERTED NEXT are points in the output color space obtained from the LUT 86b and defined by $F_1$, $F_2$, $F_3$, $F_4$ and $F_5$, respectively.

Set out below are two examples illustrating the derivation of various vectors, points and values during the interpolation process:

EXAMPLE 1 assume that:

$\overrightarrow{INPUT}$=(90, 96, 100, 110);

$\overrightarrow{BASE}$=(72, 72, 72, 72);

SVY=SVM=SVC=SVK=56; and $\overrightarrow{NEXT}$=(128, 128, 128, 128).

From the foregoing assumptions the following can be found:

$\overrightarrow{DIFF}$=(18, 24, 28, 38);

$\overrightarrow{COLOR}$=(0, 0, 0, 56);

$\overrightarrow{COMP}$=(0, 0, 56, 56);

$\overrightarrow{LOWEST}$=(0, 56, 56, 56);

PRI=(72, 72, 72, 128);
SEC=(72, 72, 128, 128);
TER=(72, 128, 128, 128);
$SV_H=SV_{MH}=SV_{ML}=SV_L=56$;
$D_1$=SVK$-C_H$=56$-$38=18;
$D_2=C_H-C_{MH}$=38$-$28=10;
$D_3=C_{MH}-C_{ML}$=28$-$24=4;
$D_4=C_{ML}-C_L$=24$-$18=6; and
$D_5=C_L$=18

EXAMPLE 2 assume that:

$\overrightarrow{INPUT}$=(90, 96, 100, 110);

$\overrightarrow{BASE}$=(72, 72, 72, 72);

SVY=40; SVM=48; SVC=54; SVK=56; and $\overrightarrow{NEXT}$=(112, 120, 126, 128).

From this information the following vectors, points and values can be determined:

$\overrightarrow{DIFF}$=(18, 24, 28, 38);

$\overrightarrow{COLOR}$=(0, 0, 0, 56);

$\overrightarrow{COMP}$=(0, 0, 54, 56);

$\overrightarrow{LOWEST}$=(0, 48, 54, 56);

PRI=(72, 72, 72, 128);
SEC=(72, 72, 126, 128);
TER=(72, 120, 126, 128);
$SV_H$=SVK=56; $SV_{MH}$=SVC=54; $SV_{ML}$=SVM=48; $SV_L$32 SVY=40;
$D_1$=SVK$-C_H$=56$-$38=18;
$D_2=C_H-C_{MH}$=38$-$28=10;
$D_3=C_{MH}-C_{ML}$=28$-$24=4;
$D_4=C_{ML}-C_L$=24$-$18=6; and
$D_5=C_L$=18.

It should be noted that where it is necessary to determine which among equal-valued components of the vector $\overrightarrow{DIFF}$ are greatest, an arbitrary decision may be made as to which will be considered the "greatest," "two greatest" or "three greatest" of the components.

It can be seen that the interpolation process involves the vector sum of scaled vectors in the output space extending from the origin thereof to the points CONVERTED BASE, CONVERTED PRI, CONVERTED SEC, CONVERTED TER and CONVERTED NEXT.

While, as noted above, the interpolation process may be implemented by the computer 72, it should be noted that the process may instead by performed by circuits identical to or equivalent to those disclosed in the Clark, et al. '833 patent incorporated by reference herein.

The values stored in the LUT 86b may be obtained by printing a target chart of 1,296 colors spaced throughout the input color space in a uniform or nonuniform fashion, as noted above, using the colorants and paper to be used in the proofing process or in the printing process. As noted above, inasmuch as the printing process is calibrated to the proofing process, it is immaterial as to which process is used to print the target chart, although it will generally be easier to create the target chart using a proofer. Each individual color of the chart is then detected using a spectrophotometer, a colorimeter or another device capable of measuring appearance values and each resulting set of appearance values is stored at a memory location accessed by an address corresponding to the amounts of each of the four colors which were used to print the color on the target chart. In this fashion, the LUT 86b can be loaded with conversion data which, together with the interpolator block 200, can be used to convert from the $Y_C$, $M_C$, $C_C$, $K_C$ printing space to the L*, a*, b* color space.

If desired, a different method of loading the LUT 86b may be utilized, for example, one that uses a regression-type analysis or other mathematical modeling technique.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

I claim:

1. A method of determining quantities of colorants used by a particular output device to produce a color, comprising the steps of:

(a) developing a set of color appearance input color signals representing the color in a color appearance space; and using a processor to implement the steps of;

(b) choosing an initial set of scan estimate signals;

(c) converting the scan estimate signals into a set of colorant estimate signals;

(d) mapping the set of colorant estimate signals into the color appearance space according to a color reproduction characteristic of the particular output device to produce a set of calculated color signals representing an approximation of the color in the color appearance space;

(e) comparing the set of color appearance input color signals to the set of calculated color signals to produce an error signal;

(f) altering the set of scan estimate signals in response to the error signal; and (g) repeating steps (c)–(f) until an error criterion is satisfied at step (e), whereupon the colorant estimate signals represent the quantities of colorants used by the particular output device to produce the color.

2. The method of claim 1, wherein the step of converting includes the steps of providing a look-up table which stores a plurality of sets of colorant quantity values, each set of which corresponds to a set of color scan values, interpolating between the sets of colorant quantity values to determine a set of colorant quantity values which corresponds to the set of scan estimate signals and providing the determined set of colorant quantity values as the colorant estimate signals.

3. The method of claim 1, wherein the step of altering includes the steps of selecting one of the set of scan estimate signals and changing the amplitude of the selected one of the set of scan estimate signals by an incremental amount.

4. The method of claim 3, wherein the step of altering includes the steps of storing an error variable value and comparing the error signal to the error variable value.

5. The method of claim 4, wherein the step of altering includes the further step of incrementing the selected one of the scan estimate signals using a set of increment variables, and wherein the step of comparing includes the step of modifying one of the set of increment variables if the error signal is greater than the error variable value.

6. The method of claim 5, wherein the step of modifying includes the steps of selecting a direction of amplitude change of the selected one of the scan estimate signals and consecutively choosing each one of the set of scan estimate signals as the selected one of the set of scan estimate signals.

7. The method of claim 6, wherein the step of modifying further includes the step of varying the incremental amount when each one of the set of scan estimate signals has been chosen as the selected one of the set of scan estimate signals.

8. The method of claim 7, wherein the step of varying includes the step of reducing the incremental amount by a particular factor.

9. The method of claim 8, wherein the error criterion is satisfied when the incremental amount falls below a predetermined level.

10. The method of claim 1, wherein the error criterion is satisfied when the error signal falls below a predetermined level.

11. The method of claim 1, wherein the color appearance space is a colorimetric color space.

12. The method of claim 1, wherein the step of developing includes the step of measuring a set of color appearance values of a color on an image.

13. The method of claim 1, wherein the step of mapping includes the steps of providing a look-up table which stores a plurality of sets of color appearance values, each set of which corresponds to a set of colorant quantity values, interpolating between the sets of colorant quantity values to determine a set of color appearance values which corresponds to the set of colorant estimate signals and providing the determined set of color appearance values as the calculated color signals.

14. An apparatus for determining quantities of colorants used by a particular output device to produce a color, comprising:

means for developing a set of color appearance input color signals representing the color in a color appearance space;

a memory for storing the color appearance input color signals; and a processing unit coupled to the memory including;

means for choosing an initial set of scan estimate signals, means for converting the set of scan estimate signals into a set of colorant estimate signals, means for mapping the set of colorant estimate signals into the color appearance space according to a color reproduction characteristic of the particular output device to produce a set of calculated color signals representing an approximation of the color in the color appearance space, means for comparing the set of color appearance input color signals to the set of calculated color signals to produce an error signal, and means responsive to the error signal for iteratively altering the set of scan estimate signals to develop a set of calculated color signals which approximates the set of color appearance input color signals according to an error criterion, whereupon the colorant estimate signals represent the quantities of colorants used by the particular output device to produce the color.

15. The apparatus of claim 14, wherein the converting means includes a look-up table which stores a plurality of sets of colorant quantity values, each set of which corresponds to a set of color scan values, an interpolator which interpolates between the sets of colorant quantity values to determine a set of colorant quantity values which corresponds to the set of scan estimate signals and means for providing the determined set of colorant quantity values as the colorant estimate signals.

16. The apparatus of claim 15, wherein the altering means includes means for changing the amplitude of one of the set of scan estimate signals by an incremental amount.

17. The apparatus of claim 16, wherein the altering means includes means for storing an error variable value and means for comparing the error signal to the error variable value.

18. The apparatus of claim 17, wherein the altering means includes means for incrementing the one of the scan estimate signals using a set of increment variables and the comparing means includes means for modifying one of the set of increment variables if the error signal is greater than the error variable value.

19. The apparatus of claim 18, wherein the modifying means includes means for selecting a direction of amplitude change of the one of the scan estimate signals and means for consecutively choosing each one of the set of scan estimate signals as the one of the set of scan estimate signals.

20. The apparatus of claim 19, wherein the modifying means further includes means for varying the incremental amount when each one of the set of scan estimate signals has been chosen as the one of the set of scan estimate signals.

21. The apparatus of claim 20, wherein the varying means includes means for reducing the incremental amount by a particular factor.

22. The apparatus of claim 21, wherein the error criterion is satisfied when the incremental amount falls below a predetermined level.

23. The apparatus of claim 14, wherein the error criterion is satisfied when the error signal falls below a predetermined level.

24. The apparatus of claim 14, including means for reproducing the color according to the set of colorant estimate signals when the error criterion is satisfied.

25. The apparatus of claim 14, wherein the developing means includes means for measuring a set of color appearance values of a color on an image.

26. The apparatus of claim 14, wherein the mapping means includes a look-up table which stores a plurality of sets of color appearance values, each set of which corresponds to a set of colorant quantity values, an interpolator which interpolates between the sets of colorant quantity values to determine a set of color appearance values which corresponds to the set of set of colorant estimate signals and means for providing the determined set of color appearance values as the calculated color signals.

* * * * *